US012711654B2

(12) United States Patent
Elcock et al.

(10) Patent No.: US 12,711,654 B2
(45) Date of Patent: Aug. 18, 2026

(54) SYSTEM AND METHOD OF POSE DETECTION USING A COMPOSITE IMAGE

(71) Applicant: Accompaneed LLC, West Chester, PA (US)

(72) Inventors: Albert Fitzgerald Elcock, West Chester, PA (US); Marc Jasner, Horsham, PA (US)

(73) Assignee: MyRaina, Inc., King of Prussia, PA (US)

( * ) Notice: Subject to any disclaimer, the term of this patent is extended or adjusted under 35 U.S.C. 154(b) by 263 days.

(21) Appl. No.: 18/673,882

(22) Filed: May 24, 2024

(65) Prior Publication Data

US 2024/0394908 A1 Nov. 28, 2024

Related U.S. Application Data

(60) Provisional application No. 63/504,572, filed on May 26, 2023.

(51) Int. Cl.

| | |
|---|---|
| ***G06K 9/00*** | (2022.01) |
| ***G06T 3/60*** | (2006.01) |
| ***G06T 7/00*** | (2017.01) |
| ***G06T 7/70*** | (2017.01) |
| *G06V 40/10* | (2022.01) |

(52) U.S. Cl.

CPC .................. *G06T 7/70* (2017.01); *G06T 3/60* (2013.01); *G06T 7/0002* (2013.01); *G06T 2207/20084* (2013.01); *G06T 2207/20221* (2013.01); *G06T 2207/30168* (2013.01); *G06T 2207/30196* (2013.01); *G06T 2207/30232* (2013.01); *G06V 40/10* (2022.01)

(58) Field of Classification Search

USPC ....... 382/100, 103, 106, 156, 173, 181, 254, 382/305

See application file for complete search history.

(56) References Cited

U.S. PATENT DOCUMENTS

| | | | | |
|---|---|---|---|---|
| 2005/0147292 | A1* | 7/2005 | Huang | G06F 18/254 382/218 |
| 2021/0312646 | A1* | 10/2021 | LeGendre | G06T 7/37 |
| 2022/0207888 | A1* | 6/2022 | Nakamura | B60K 35/235 |
| 2022/0331028 | A1* | 10/2022 | Sternitzke | A61B 5/1176 |
| 2022/0392099 | A1* | 12/2022 | Guay | G06N 3/084 |
| 2023/0368065 | A1* | 11/2023 | Koike Akino | G06N 10/60 |
| 2024/0112469 | A1* | 4/2024 | Mitra | G06V 40/10 |

* cited by examiner

*Primary Examiner* — Seyed H Azarian

(74) *Attorney, Agent, or Firm* — Riverside Law LLP

(57) ABSTRACT

A method of pose detection includes the steps of receiving a first image of a subject in an original orientation, generating a second image of the subject rotated 90 degrees from the original orientation, a third image of the subject rotated 180 degrees from the original orientation, and a fourth image of the subject rotated 270 degrees from the original orientation, generating a composite image comprising the first, second, third and fourth image, detecting one or more poses in the composite image, selecting a detected pose of the subject from the composite image based on a usability criteria, rotating the composite image such that the detected pose is in the original orientation, and transmitting the detected pose in the original orientation to a remote server. A system for pose detection and alternate methods and systems for pose detection are also disclosed.

14 Claims, 13 Drawing Sheets

SYSTEM AND METHOD OF POSE DETECTION USING A COMPOSITE IMAGE

CROSS-REFERENCE TO RELATED APPLICATIONS

This application claims priority to U.S. provisional application No. 63/504,572 filed on May 26, 2023 incorporated herein by reference in its entirety.

BACKGROUND OF THE INVENTION

According to the CDC, "Each year, millions of older people—those 65 and older—fall. In fact, more than one out of four older people falls each year, but less than half tell their doctor. Falling once doubles your chances of falling again." While many falls do not result in injuries, one in five falls does cause a serious injury such as a broken bone or a head injury. Fall statistics are so high that more than a dozen companies have developed products and services to aid this population.

The most popular medical alert systems currently on the market are limited to wearables. Some come with such warnings as, "To reduce any risk of strangulation . . . ". Many of them require the older populations to initiate a call action while others provide autosense capabilities to detect a fall. Even those with autosense capabilities include cautions such as, "does not detect 100% of falls." In addition, approximately 30% of older Americans find wearables, such as Apple watches, uncomfortable or inconvenient and therefore do not use them. Further, almost all current medical alert systems require some form of contact or interaction with the person being monitored.

Connected camera systems currently available, by design, send images to remote locations (i.e. the cloud) for algorithmic processing, storage and/or communication to intended subscribers. Examples include brand names such as Wyze cameras, Blink and Ring doorbells. Though some of these connected cameras are used for monitoring older populations, concerns about privacy prevent fuller utilization of cameras in the home.

In contrast, there is a current passive monitoring solution that leverages an embedded camera system converting images to skeletal forms through pose detection and subsequently fall detection. Unlike connected camera systems currently available, the passive monitoring solution does not send images of people, but rather only a graphical representation of the images of people. However, it does send augmented video frames of the environment where the camera is being used (e.g. content of a room in the field of view of the camera are readily available to the user).

Other passive monitoring solutions available in the market include very expensive systems used in nursing homes and hospitals, such as bed and seat alarms. Passive monitoring systems do not require direct interaction with the person being monitored to identify a risk condition and initiate an alarm. There is also an emerging passive monitoring technology using Wi-Fi.

Despite the significant investment in, and scope of solutions to monitor the elderly and notify others in the event of an emergency, the adoption of these solutions is still well below meeting the need. This is in part because existing technologies are either not trusted because of privacy concerns or inadequate in their capabilities. Overall, apart from technologies such as the Apple Watch, there is little available today that assists in identifying or predicting unsafe habits and practices of, or conditions for the elderly that increase the risk of a fall. In addition, passive monitoring camera solutions available today appear to have pitfalls in at least three ways: (1) none of the data leaving the home is encrypted; (2) skeletal representations of the person or people being monitored are readily available to someone using their application on a mobile device paired with their camera system; and (3) images of the contents of the elderly person's room are also available via remote devices.

Embodiments of the invention described below include improved systems that represent an improvement over conventional systems while addressing the numerous deficiencies in the art described above.

SUMMARY OF THE INVENTION

In one embodiment, a method of transferring data for pose detection includes the steps of receiving a first plurality of images; determining that a subject is present in at least one of the first plurality of images; designating at least one image based on the determining; generating a plurality of skeletal data points for the designated at least one image and forming a skeletal data set comprising the plurality of skeletal data points; generating a signature data set for the designated at least one image by associating a unique ID with the skeletal data set; and transmitting the signature data set to a remote server. In one embodiment, the method includes encrypting the signature data set prior to the step of transmitting. In one embodiment, the generating a plurality of skeletal data points further comprises processing the image through a pose detection neural network. In one embodiment, the generating a signature data set further comprises associating the signature data set with a subject. In one embodiment, the method includes determining if more than one subject is present. In one embodiment, the method includes determining whether a detected subject is a subject being monitored and transmitting based on the determining. In one embodiment, the method includes determining whether a detected subject is associated with a subject being monitored and transmitting based on the determining. In one embodiment, the method includes detecting an adverse physical event of the subject based on the signature dataset. In one embodiment, the adverse physical event is a fall. In one embodiment, the method is a method for monitoring of a subject, where the first plurality of images are generated by a camera located in a residential environment.

In one embodiment, a system for transferring data for pose detection includes a camera communicatively coupled to a controller, the controller configured to: receive a first plurality of images generated from the camera, determine that a subject is present in at least one of the first plurality of images, designate at least one image based on the determining, generate a plurality of skeletal data points for the designated at least one image, generate a signature data set for the designated at least one image by associating a unique ID for each of the plurality of skeletal data points, and transmit the signature data set to a remote server. In one embodiment, the controller is configured to encrypt the signature data set prior to the step of transmitting. In one embodiment, the generating a plurality of skeletal data points further comprises processing the image through a pose detection neural network. In one embodiment, the generating a signature data set further comprises associating the signature data set with a subject. In one embodiment, the controller is configured to determine if more than one subject is present. In one embodiment, the controller is configured to determine whether a detected subject is a subject being monitored and transmit based on the determining. In one embodiment, the controller is configured to determine whether a detected subject is associated with a subject being monitored and transmit based on the determining. In one embodiment, the controller is configured to detect an adverse physical event based on the signature data. In one embodiment, the adverse physical event is a fall. In one embodiment, the system is a system for monitoring of a subject, where the first plurality of images are generated by a camera located in a residential environment.

In one embodiment, a method of pose detection includes the steps of receiving a first image of a subject in an original orientation; generating a second image of the subject rotated 90 degrees from the original orientation, a third image of the subject rotated 180 degrees from the original orientation, and a fourth image of the subject rotated 270 degrees from the original orientation; generating a composite image comprising the first, second, third and fourth image; detecting one or more poses in the composite image; selecting a detected pose of the subject from the composite image based on a usability criteria; rotating the composite image such that the detected pose is in the original orientation; and transmitting the detected pose in the original orientation to a remote server. In one embodiment, the method includes the step of determining dimensions of the received image. In one embodiment, the composite image width equals the sum of the width and height of the first image. In one embodiment, the composite image height equals the sum of the width and height of the first image. In one embodiment, the composite image comprises first, second, third and fourth image configured about its perimeter. In one embodiment, the method includes the step of selecting a detected pose of the subject comprises processing the composite image through a pose detection neural network. In one embodiment, the method includes the step of checking for usability comprises detecting visibility of at least one side of the body. In one embodiment, detecting visibility comprises detecting at least a shoulder, hip, and knee. In one embodiment, the method is a method for monitoring of a subject, where first image is generated by a camera located in a residential environment.

In one embodiment, a system for pose detection includes a camera communicatively coupled to a controller, the controller configured to: receive a first image of a subject in an original orientation; generate a second image of the subject rotated 90 degrees from the original orientation, a third image of the subject rotated 180 degrees from the original orientation, and a fourth image of the subject rotated 270 degrees from the original orientation; generate a composite image comprising the first, second, third and fourth image; select an image of the subject from the composite image based on a usability criteria; detect a pose in the selected image; rotate the detected pose back to the original orientation; and transmit the detected pose in the original orientation to a remote server. In one embodiment, the controller is configured to determine dimensions of the received image. In one embodiment, the composite image width equals the sum of the width and height of the first image. In one embodiment, the composite image height equals the sum of the width and height of the first image. In one embodiment, the composite image comprises first, second, third and fourth image configured about its perimeter. In one embodiment, selecting a detected pose of the subject comprises processing the composite image through a pose detection neural network. In one embodiment, checking for usability comprises detecting visibility of at least one side of the body. In one embodiment, detecting visibility comprises detecting at least a shoulder, hip, and knee. In one embodiment, the system is a system for monitoring of a subject, where the first image is generated by a camera located in a residential environment.

In one embodiment, a method of pose detection includes the steps of receiving a first image of a subject in an original orientation; generating a second image of the subject rotated 90 degrees from the original orientation, a third image of the subject rotated 180 degrees from the original orientation, and a fourth image of the subject rotated 270 degrees from the original orientation; detecting a pose in the selected image; selecting at least one of the first, second, third and fourth images based on a usability criteria; rotating the detected pose back to the original orientation; and transmitting the detected pose in the original orientation to a remote server. In one embodiment, the method includes the step of selecting an image of the subject comprises processing the composite image through a pose detection neural network. In one embodiment, the method includes the step of checking for usability comprises detecting visibility of at least one side of the body. In one embodiment, the method includes the step of detecting visibility comprises detecting at least a shoulder, hip, and knee.

In one embodiment, a system for pose detection includes a camera communicatively coupled to a controller, the controller configured to receive a first image of a subject in an original orientation; generate a second image of the subject rotated 90 degrees from the original orientation, a third image of the subject rotated 180 degrees from the original orientation, and a fourth image of the subject rotated 270 degrees from the original orientation; select at least one of the first, second, third and fourth images based on a usability criteria; detect a pose in the selected image; rotate the detected pose back to the original orientation; and transmit the detected pose in the original orientation to a remote server. In one embodiment, selecting an image of the subject comprises processing the composite image through a pose detection neural network. In one embodiment, checking for usability comprises detecting visibility of at least one side of the body. In one embodiment, detecting visibility comprises detecting at least a shoulder, hip, and knee.

In one embodiment, a method of pose detection includes the steps of receiving a first image of a subject in an original orientation; rejecting the first image based on failing a usability criteria; generating a rotated first image; tagging the first image; accepting the rotated first image based on passing the usability criteria; detecting a pose in the rotated first image; rotating the detected pose back to the original orientation; and transmitting the detected pose in the original orientation and tag to a remote server. In one embodiment, selecting an image of the subject comprises processing the composite image through a pose detection neural network. In one embodiment, the rotated first image is rotated 90 degrees from the original orientation. In one embodiment, the rotated first image is rotated 180 degrees from the original orientation. In one embodiment, the rotated first image is rotated 270 degrees from the original orientation. In one embodiment, checking for usability comprises detecting visibility of at least one side of the body. In one embodiment, detecting visibility comprises detecting at least a shoulder, hip, and knee.

In one embodiment, a system for pose detection includes a camera communicatively coupled to a controller, the controller configured to: receive a first image of a subject in an original orientation; reject the first image based on failing a usability criteria; generate a rotated first image; associate a rotation angle to the rotated first image; accept the rotated first image based on passing the usability criteria; detect a pose in the rotated first image; rotate the detected pose back to the original orientation; and transmit the detected pose and associated rotation angle in the original orientation to a remote server. In one embodiment, selecting an image of the subject comprises processing the image through a pose detection neural network. In one embodiment, the rotated first image is rotated 90 degrees from the original orientation. In one embodiment, the rotated first image is rotated 180 degrees from the original orientation. In one embodiment, the rotated first image is rotated 270 degrees from the original orientation. In one embodiment, checking for usability comprises detecting visibility of at least one side of the body. In one embodiment, detecting visibility comprises detecting at least a shoulder, hip, and knee.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION OF THE INVENTION

Figure 1:
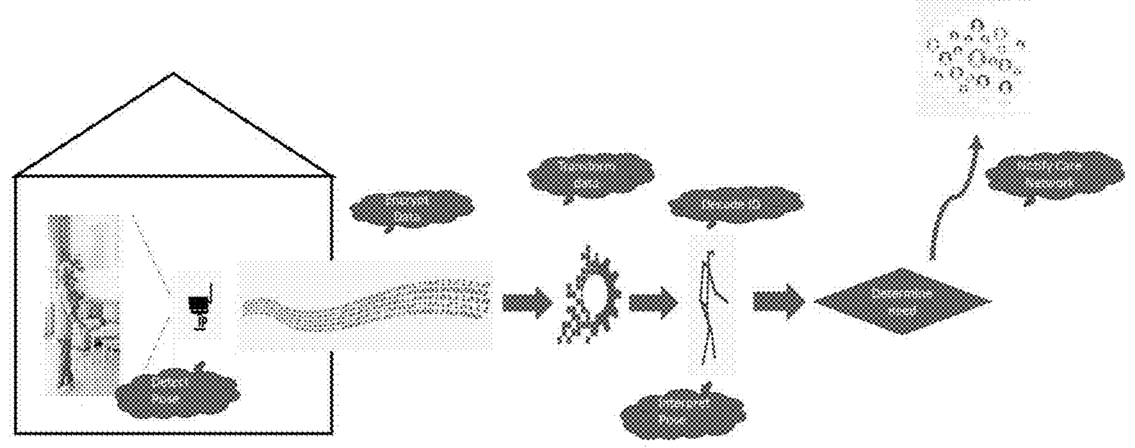
FIG. 1 is a diagram of a passive monitoring system workflow according to one embodiment.

It is to be understood that the figures and descriptions of the present invention have been simplified to illustrate elements that are relevant for a more clear comprehension of the present invention, while eliminating, for the purpose of clarity, many other elements found in systems and methods of passive monitoring. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein is a passive monitoring system.

Embodiments of the passive monitoring system described herein utilize a camera with a processing system with multiple neural networks used to detect health-related conditions, a cloud component that interprets the outputs of the neural networks, and a mobile application that receives alerts when health-related conditions are detected. With reference now to FIG. 1, private images are converted in the home to data arrays (or signature data), then encrypted prior to streaming them remotely. Signature data can include postures (or skeletal data points) and the assignment of a unique identifier (UID) with each dataset. The UID can include of one or more of the following:

Device Unique Identifier such as a serial number or MAC address.

Face ID for the image of each person in a given video frame.

Posture ID. This is particularly important in the context where a Subject is backing the camera. Their posture will be used to comprise the UID.

A timestamp for the given video frame.

Once the Signature Data is received by the cloud component, the data is decrypted, transformed, and both posture analysis and person recognition are completed. Person recognition in the Cloud is based on the UID sent by the camera system. Finally, need algorithms are processed to determine whether to notify a previously defined Care Network. A Care Network is defined to be anyone who provides a service to assist the elderly and includes one or more of family members, healthcare workers or emergency personnel.

Figure 2:
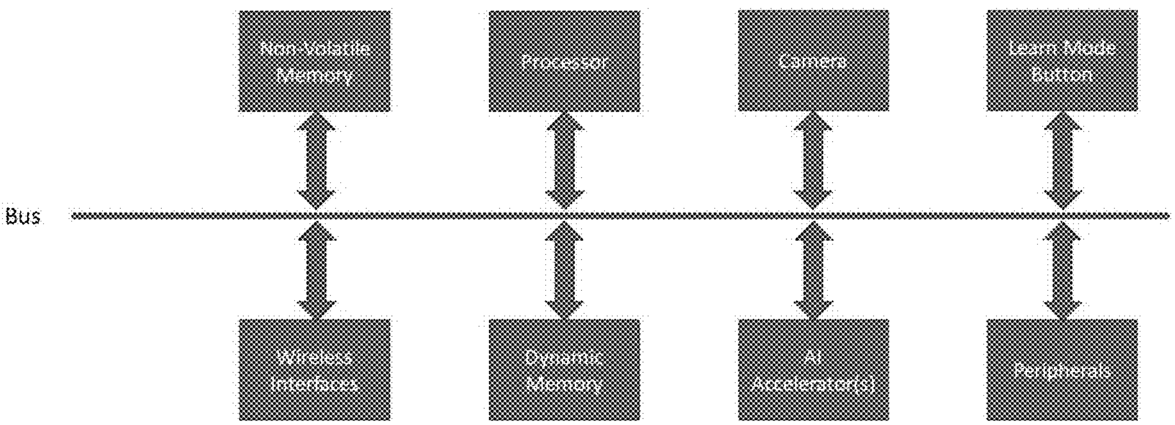
FIG. 2 is a diagram of a passive monitoring system hardware component setup according to one embodiment.

With reference now to FIG. 2, embodiments of the camera system provide a means to enable non-wearable technology as an adjunct, and in some cases a replacement for existing wearable solutions for monitoring the health and safety of older populations. The hardware elements comprise the system that enables protecting the privacy of older populations while utilizing a camera system to offer a non-wearable, passive solution to health monitoring. The primary components of the camera system include the processor (CPU), camera, wireless interfaces, dynamic memory, non-volatile storage for operating software and one or more AI accelerators. The permanent storage for video recording, peripherals and learn mode button provide optional feature additions for extensibility.

Figure 3:
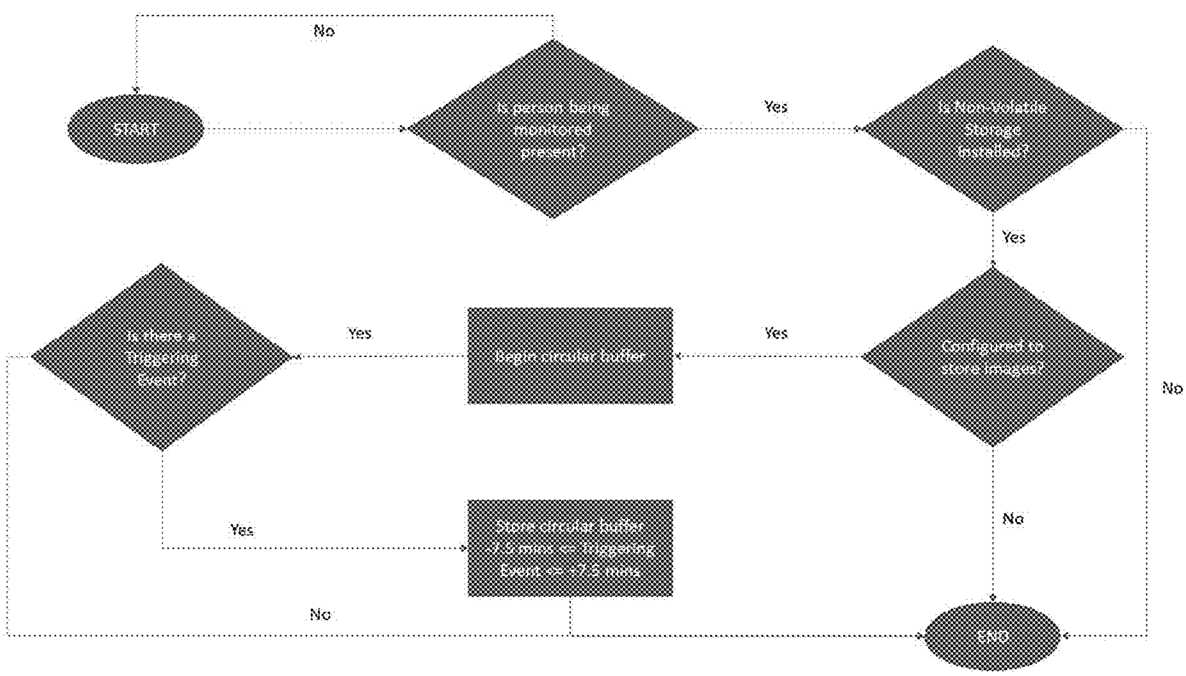
FIG. 3 is a flow chart for how encrypted images are stored locally in the camera system and only retrieved using special access rights according to one embodiment.

Now describing components of FIG. 2 in more detail:

Non-Volatile memory is an optional component that can be used to enable subscribers to access real-time and buffered full images once a triggering event occurs. As shown for example in FIG. 3, these encrypted images are stored locally in the camera system and can only be retrieved using special access rights. In one embodiment, the following conditions are required to enable image buffering: (1) the presence of one or more people being monitored, (2) non-volatile storage is installed, and (3) the feature to optionally buffer images is enabled.

In one embodiment, using a circular, configurable image buffer (default is 15 minutes), the system begins recording encrypted images when the conditions above are met. However, images are only stored encrypted for retrieval at a later time after a triggering event occurs. There are at least three types of events defined:

Lifestyle Event-A reported event, such as when going from sitting to standing, to the care network or an in-home care provider that co-presence or closer monitoring may be required. It may also include for example walking without an assistive device when one is required.

Monitoring Event-A reported event to the care network, such as a pattern of instability when going from sitting to standing, which may indicate the need for personalized care. Other events may include for example rocking backwards and forwards to stand up, sliding onto the floor from a sitting position, and furniture cruising (i.e. using furniture as an assistive device to stabilize yourself).

Triggering Event-A reported event to the care network, such as a fall or smoke detection, which is likely to require an emergent response. Events may also include for example detecting that the stove is left on, the refrigerator door alarm has been going off for an extended period, one of the doors to the house has been left open, and a lifestyle pattern change such as not returning to your chair when it's typical that for that time of day you're back in 15 minutes and it's been much longer (subject to mid-term pattern learning).

Encrypted, stored images can be made available to one or more persons in the care network via a well-known transport mechanism such as HTTPS, FTPS/SFTP, etc. Subscribers are given the option to store buffered recordings in storage locations of their choosing. For example, using a mobile application they may choose Google, Apple, or another popular Cloud storage service. Additionally, once a triggering event occurs, subscribers are given the option to immediately "check-in". Selecting this option will give them the ability to immediately view the 7½ minutes of encrypted video buffer immediately preceding the notification. Alternatively, non-volatile storage could be used to buffer signature data, and/or decoded signature data (i.e. skeletal representations of the images). This buffered data could be stored for later use or analysis to improve medical treatments for the elderly. For example, under certain circumstances, Subscribers may wish to share recorded video with care providers such as physical therapists or other clinicians without making images available.

The CPU is an integral component of any computer-based system controlling the interpretation and executions of instructions.

The camera may include both day and night vision with night vision being an essential feature. In addition, the camera may leverage an array of cameras or array of lenses that are used for more comprehensive room coverage for almost 100% field of view, and aggregates full and partial images to improve the accuracy while creating signature data. Current camera solutions used for monitoring employ only one camera lens in their camera system resulting in a limited or directional view angle. This limited view angle can be effective for contexts where the mobility of the person being monitored is restricted to a more confined area. However, this limited view is not as effective in a situation where a camera will be used to monitor an elderly person with good mobility. While fisheye lenses do increase the field of view and are a useful addition, it still results in a limited field for view for an indoor monitoring application because of the short distance between the camera and a person of interest.

The learn mode button is an optional button that when depressed after the setup process is complete, which includes identifying the person or persons being monitored, puts the camera system into a mode where baseline signatures for the following are created (including but not limited to):

Nominal body posture when sitting and standing. For example, does the person slouch when sitting? Are they bent over when standing?

Nominal ambulation characteristics. For example, does the person use an aid such as a walking stick or a walker? Does the person walk with a limp?

Developing a baseline enables more effecting monitoring of change or high-risk behaviors. For example, a person who should be using a cane or walker, but instead is furniture cruising is at an increased risk of falling. Learn mode will automatically exit to monitoring mode after a predefined period. This period is based on whether algorithms, like the number of hours the person being monitored, amount of time sitting, standing and walking are satisfied.

Wireless interfaces are implemented to enable proper functionality of this camera solution include Wi-Fi and Bluetooth. Wi-Fi is used for network connectivity and enable real-time communication with servers in the Cloud. Bluetooth is used during the setup process to privately transfer credentials from a mobile device previously used on the Wi-Fi network for easy setup. In addition, Bluetooth can also be used to develop extended features such as direct connection to BT-enabled earpieces to enhance communication with the hearing-impaired, and the external addition of microphones and speakers. Adding external BT microphones and speakers overcomes the shortcoming of an elderly person trying to speak into a camera system that is located at least 5-feet high on a wall and possibly 10 or more feet from someone who needs help. By placing BT enabled microphones/speakers in one or more locations around the room effective communication is more easily enabled.

Bluetooth and other wireless interfaces enable integrations with other critical connected systems such as smoke alarms and other home appliances. While mobile applications and other control applications are typically available with today's home appliances, their use is not associated with the lifestyles of an elderly person. For example, repeatedly forgetting to close a refrigerator door could indicate onset of a memory-related problem.

As with all CPU-driven systems, dynamic memory is utilized as a central workhorse for creating buffers and moving data across system interfaces.

One or more AI accelerators is implemented to gain the required responsiveness needed to generate signature data. In using an AI accelerator, the CPU is offloaded and the overall performance of the system increases to ensure necessary responsiveness. Additionally, AI accelerators are purpose built for the types of calculations necessary for the operation of features of the system, and therefore offer far superior performance to standard CPUs.

Peripherals include optional components such as microphones and speakers. While not an essential part of the system, they can provide good enhancements for contexts that warrant them. For example, they can be used to enable 2-way communication. The microphone can be used in conjunction with machine learning to determine whether an alarm has been triggered (i.e. smoke alarm, door alarms-fridge door left open too long, front or back door open, etc.). The speaker could additionally be used as an alarm for cases where emergent attention is needed. An alarm feature is important in contexts where more than one elderly person is living as hearing impairment is common among the elderly. Cases have been recorded where an elderly person's cry for help was not heard by their partner because of their partner's hearing impairment.

In some aspects of the passive monitoring system, software executing the instructions provided herein may be stored on a non-transitory computer-readable medium, wherein the software performs some or all of the steps of the embodiments when executed on a processor.

Aspects of the passive monitoring system relate to algorithms executed in computer software. Though certain embodiments may be described as written in particular programming languages, or executed on particular operating systems or computing platforms, it is understood that the passive monitoring system is not limited to any particular computing language, platform, or combination thereof. Software executing the algorithms described herein may be written in any programming language known in the art, compiled or interpreted, including but not limited to C, C++, C#, Objective-C, Java, JavaScript, MATLAB, Python, PHP, Perl, Ruby, or Visual Basic. It is further understood that elements of the passive monitoring system may be executed on any acceptable computing platform, including but not limited to a server, a cloud instance, a workstation, a thin client, a mobile device, an embedded microcontroller, a television, or any other suitable computing device known in the art.

Parts of the passive monitoring system are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of the passive monitoring system are described as communicating over a variety of wireless or wired computer networks. For the purposes of embodiments of this invention, the words "network", "networked", and "networking" are understood to encompass wired Ethernet, fiber optic connections, wireless connections including any of the various 802.11 standards, cellular WAN infrastructures such as 3G, 4G/LTE, or 5G networks, Bluetooth®, Bluetooth® Low Energy (BLE) or Zigbee® communication links, or any other method by which one electronic device is capable of communicating with another. In some embodiments, elements of the networked portion of the passive monitoring system may be implemented over a Virtual Private Network (VPN).

Figure 4:
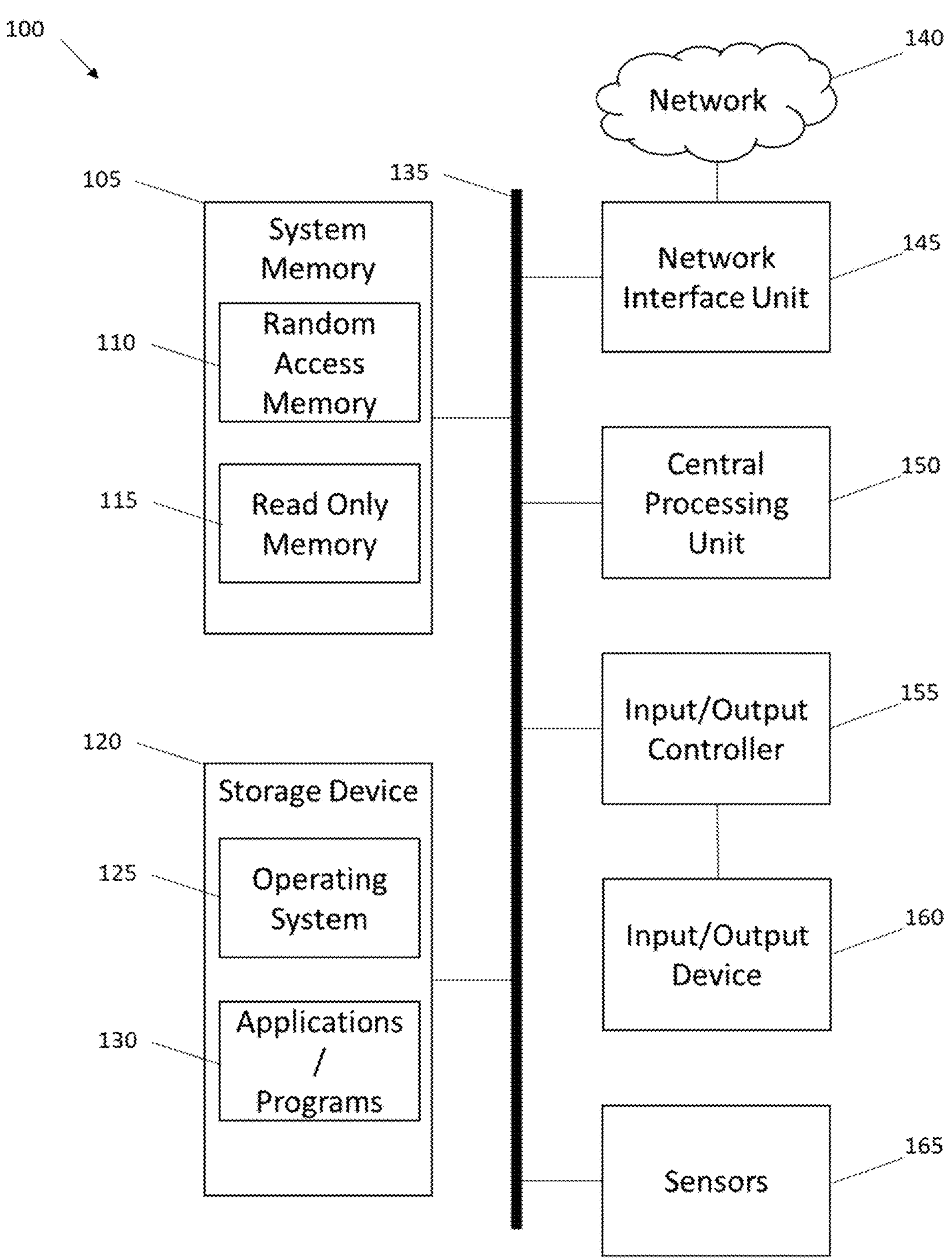
FIG. 4 is a computing environment for use with a passive monitoring system according to one embodiment.

FIG. 4 and the following discussion are intended to provide a brief, general description of a suitable computing environment in which the passive monitoring system may be implemented according to one embodiment. While the passive monitoring system is described above in the general context of program modules that execute in conjunction with an application program that runs on an operating system on a computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The passive monitoring system may also be practiced in distributed computing environments where tasks are performed by remote processing devices that are linked through a communications network. In a distributed computing environment, program modules may be located in both local and remote memory storage devices.

FIG. 4 depicts an illustrative computer architecture for a computer 100 for practicing the various embodiments of the invention. The computer architecture shows a conventional personal computer, including a central processing unit 150 ("CPU"), a system memory 105, including a random-access memory 110 ("RAM") and a read-only memory ("ROM") 115, and a system bus 135 that couples the system memory 105 to the CPU 150. A basic input/output system containing the basic routines that help to transfer information between elements within the computer, such as during startup, is stored in the ROM 115. The computer 100 further includes a storage device 120 for storing an operating system 125, application/program 130, and data.

The storage device 120 is connected to the CPU 150 through a storage controller (not shown) connected to the bus 135. The storage device 120 and its associated computer-readable media, provide non-volatile storage for the computer 100. Although the description of computer-readable media contained herein refers to a storage device, such as flash memory, a hard disk or CD-ROM drive, it should be appreciated by those skilled in the art that computer-readable media can be any available media that can be accessed by the computer 100.

By way of example, and not to be limiting, computer-readable media may comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the passive monitoring system, the computer 100 may operate in a networked environment using logical connections to remote computers through a network 140, such as TCP/IP network such as the Internet or an intranet. The computer 100 may connect to the network 140 through a network interface unit 145 connected to the bus 135. It should be appreciated that the network interface unit 145 may also be utilized to connect to other types of networks and remote computer systems.

The computer 100 may also include an input/output controller 155 for receiving and processing input from a number of input/output devices 160, including a keyboard, a mouse, a touchscreen, a camera, a microphone, a controller, a joystick, or other type of input device. Similarly, the input/output controller 155 may provide output to a display screen, a printer, a speaker, or other type of output device. The computer 100 can connect to the input/output device 160 via a wired connection including, but not limited to, fiber optic, ethernet, or copper wire or wireless means including, but not limited to, Wi-FI, Bluetooth, Near-Field Communication (NFC), infrared, or other suitable wired or wireless connections.

As mentioned briefly above, a number of program modules and data files may be stored in the storage device 120 and RAM 110 of the computer 100, including an operating system 125 suitable for controlling the operation of a networked computer. The storage device 120 and RAM 110 may also store one or more applications/programs 130. In particular, the storage device 120 and RAM 110 may store an application/program 130 for providing a variety of functionalities to a user.

The computer 100 in some embodiments can include a variety of sensors 165 for monitoring the environment surrounding and the environment internal to the computer 100. These sensors 165 can include physiological sensors, sensors on household appliances and mechanical systems, a Global Positioning System (GPS) sensor, a photosensitive sensor, a gyroscope, a magnetometer, thermometer, a proximity sensor, an accelerometer, a microphone, biometric sensor, barometer, humidity sensor, radiation sensor, or any other suitable sensor.

A system and method to securely transfer data for pose detection is now described.

Embodiments for a system and method to securely transfer data for pose detection address privacy concerns by enabling in-home translation of private images to signature data, encrypting it and sending this signature data (instead of private images) to the cloud for analysis and health risk detection. In addition, disaggregating the signature data from the analysis and health risk detection further protects the privacy of those being monitored. That is, even if someone hacks the signature data, they would be limited to posture data points. To make sense of these data points would require additional tools, algorithms and interpretation.

Figure 5:
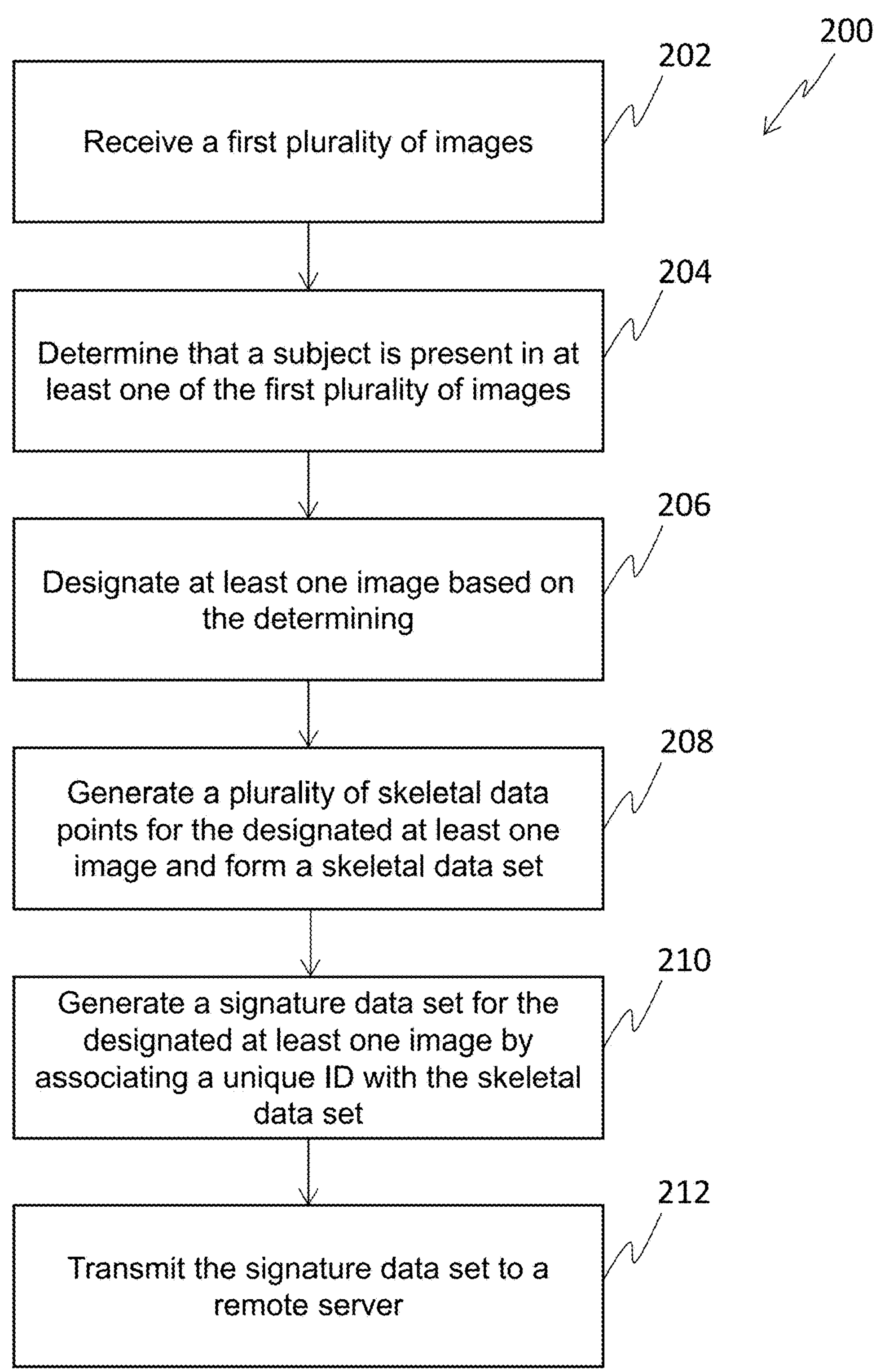
FIG. 5 is a flow chart of a method of transferring data for pose detection according to one embodiment.

With reference now to FIG. 5, in one embodiment, a method 200 of transferring data for pose detection includes the steps of receiving a first plurality of images 202, determining that a subject is present in at least one of the first plurality of images 204, designating at least one image based on the determining 206, generating a plurality of skeletal data points for the designated at least one image 208, generating a signature data set for the designated at least one image by associating a unique ID with each skeletal data set of skeletal data points 210, and transmitting the signature data set to a remote server 212. The unique ID can for example be associated first with each skeletal data point before the skeletal data set is formed, or applied to the skeletal data set after the set is formed using the skeletal data points.

Figure 6:
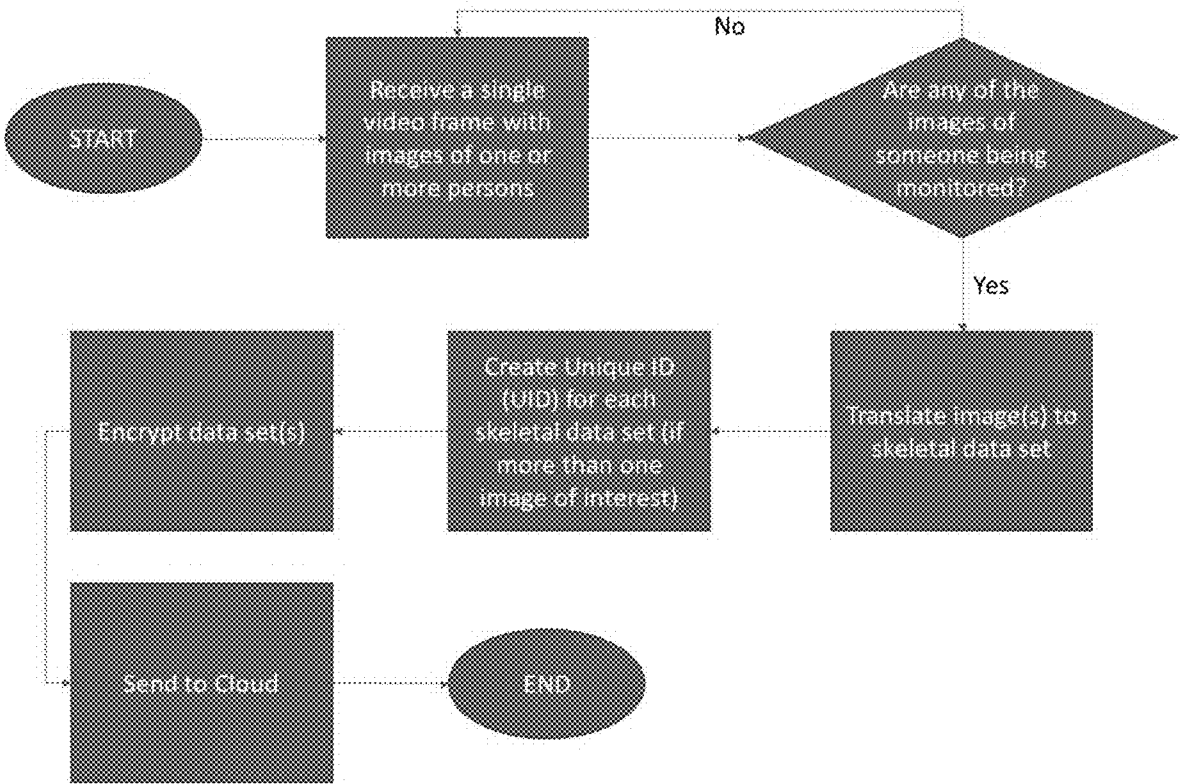
FIG. 6 is a flow chart of a process that enables the secure transfer of signature data for one or more subjects being monitored according to one embodiment, enabling the translation of private images to signature data, encrypting it and sending the signature data.

With reference now to FIG. 6, a flow chart showing the secure transfer of signature data for one or more subjects being monitored is described according to one embodiment.

Step 1: Each video frame with one or more images is processed to first determine if a person being monitored is present. There are several possibilities:

(1) There is no one present in the video frame.

(a) No data is sent to the cloud.

(b) If there is non-volatile storage and a circular buffer is enabled, the system will not record.

(2) There is one or more people present, but not anyone being monitoring.

(a) signature data is sent to the cloud and associated with the account, but not associated with anyone being monitored. If a fall is detected, but the association with someone being monitored can't be made, a notification is still communicated to the care network.

(b) If there is non-volatile storage and a circular buffer is enabled, it will still record images and skeletal data.

(3) There are several people present including one or more people being monitored.

Option A: Allow Subscribers to configure the system to either send or suppress sending signature data if more than one person not being monitored is present. Electing to suppress sending signature data to the cloud, will also automatically turn off notifications. Turning off notifications in this context may be desirable based on the assumption that the person or persons present, but not being monitored would call for help in the event of an emergency.

Option B: Allow subscribers to configure the system to either send or suppress notifications if more than one person not being monitored is present. In this case, signature data would be sent to the cloud, but if elected, notifications would be suppressed while a person not being monitored is present. This may be desirable based on the assumption that the person or persons present would call for help in the event of an emergency, but there would be a cloud-based record of triggering events that would otherwise lead to a notification.

Option C: Enable subscribers to change between Option A and B above.

Note: For the cases above where notifications are suppressed, notifications will automatically be reenabled once those conditions are no longer present.

(4) Only people that are being monitored are present.

(a) If only one person is being monitored: The image in the video frame is translated to a skeletal dataset. A unique ID is associated with each skeletal dataset for a given subject to create signature data. The signature data is then encrypted prior to being sent to the cloud using one of a well-known data encryption and transport encryption method.

(b) If more than one person is being monitored: Each image in the video frame is translated to a skeletal dataset.

A unique ID is associated with each skeletal dataset for the 'n' number of subjects in the image to create 'n' sets of signature data. Each signature data set is then encrypted prior to being sent to the cloud using one of a well-known data encryption and transport encryption method.

Step 2: Create skeletal data points for each image of interest in the frame by processing the image through a pose detection neural network.

Step 3: Create signature data for each image in the frame by associating the unique ID for each image with the skeletal data points. This UID is used by the cloud application to make specific associations of the data with a person or persons and their account.

Step 4: Once the signature data is created, the next step is to encrypt the data using well-known methods of data encryption such as DES, AES, etc., before sending it to the Cloud using well-known methods of secure data transfer, such as HTTPS, TLS, etc.

Figure 7:
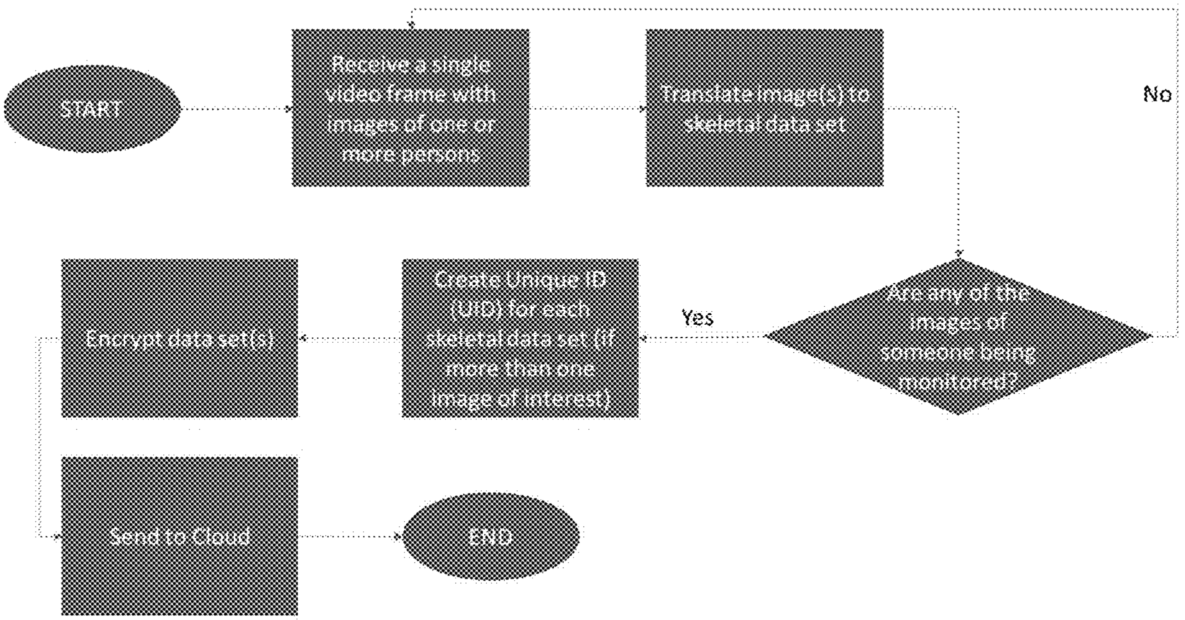
FIG. 7 is a flow chart of a process that enables the secure transfer of signature data for one or more subjects being monitored according to one embodiment, translating the image to a dataset first then making the determination of whether there are images of interest.

With reference now to FIG. 7, according to one embodiment, the image is translated to a dataset first and then a determination is made as to whether there are images of interest.

Step 1: Each video frame with one or more images is used to create skeletal data points for each image in the frame by processing the image through a neural network.

Step 2: Each skeletal data set is analyzed to determine if a person being monitored is present.

Step 3: Create signature data for each skeletal data set of interest in the frame by associating the unique ID for each skeletal data set with the skeletal data points. This UID is unique and is used by the cloud application to make specific associations of the data with a person or persons and their account. Skeletal data sets that are not of people being monitored are discarded based on the system configuration described in Step 1 of the previous embodiment.

Step 4: Once the signature data is created, the next step is to encrypt the data using well-known methods of data encryption such as DES, AES, etc., before sending it to the cloud using well-known methods of secure data transfer, such as HTTPS, TLS, etc., Accordingly, in one embodiment, the method 200 includes the step of encrypting the signature data set prior to the step of transmitting. In one embodiment, the generating a plurality of skeletal data points further comprises processing the image through a pose detection neural network. In one embodiment, the generating a signature data set further comprises associating the signature data set with a subject. In one embodiment, the method 200 includes the step of determining if more than one subject is present. In one embodiment, the method 200 includes the step of determining whether a detected subject is a subject being monitored and transmitting based on the determining. In one embodiment, the method 200 includes the step of determining whether a detected subject is associated with a subject being monitored and transmitting based on the determining. This may include for example detecting subjects that are known caretakers or otherwise are authorized to be with the subject being monitored (e.g. via detecting or confirming proper credentials). Detecting subjects that are not associated with the subject being monitored can trigger additional alerts or investigative measures. In one embodiment, the method 200 includes the step of detecting an adverse physical event of the subject based on the signature data. In one embodiment, the adverse physical event is a fall. In one embodiment, the first plurality of images are generated by a camera located in a home environment. Embodiments described herein that reference a home or residential environment may include for example a private dwelling (e.g. a single-family home or apartment) or a long-term care facility. The home or residential environment can for example include any environment that the subject utilizes as a place of residence or shelter whether permanent or temporary. The home or residential environment can include for example indoor environments within these structures and outdoor environments adjacent to, proximate to or surrounding the indoor environments.

A system for implementing the method 200 can include for example a camera communicatively coupled to a controller, the controller configured to: receive a first plurality of images generated from the camera, determine that a subject is present in at least one of the first plurality of images, designate at least one image based on the determining, generate a plurality of skeletal data points for the designated at least one image and form a skeletal data set, generate a signature data set for the designated at least one image by associating a unique ID with the skeletal data set, and transmit the signature data set to a remote server. In one embodiment, the controller is configured to encrypt the signature data set prior to the step of transmitting. In one embodiment, the generating a plurality of skeletal data points further comprises processing the image through a pose detection neural network. In one embodiment, the generating a signature data set further comprises associating the signature data set with a subject. In one embodiment, the controller is configured to determine if more than one subject is present. In one embodiment, the controller is configured to determine whether a detected subject is a subject being monitored and transmit based on the determining. In one embodiment, the controller is configured to determine whether a detected subject is associated with a subject being monitored and transmit based on the determining. In one embodiment, the controller is configured to detect an adverse physical event based on the signature data. In one embodiment, the adverse physical event is a fall. Adverse physical events may also include for example detecting somebody standing that should not be standing on their own. In one embodiment, the first plurality of images are generated by a camera located in a residential environment. Other environments for the systems and methods described herein may include for example long-term care facilities, skilled nursing facilities, and nursing homes.

A method to improve the reliability of pose detection using pose rotation is now described.

Current solutions using artificial intelligence to convert images to 2D or 3D skeletal data are minimally effective when the subject or image is of someone in a laying, horizontal position. Stated another way, pose detection neural networks seem to be "vertically biased" and have trouble detecting poses of horizontal bodies. As a human body transitions through a fall, it most often terminates in a horizontal position for an elderly person. While an able-bodied person may be able to transition through a fall and end in a kneeling position, this is more difficult and less likely for an elderly person. The ability to definitively and consistent determine or predict that someone is in a laying down position is critical to detecting falls and other potential cases that may require an emergency response.

Given that the pose detection algorithms are biased and most reliable when the human body is in a standing position, each image can be rotated at a 90 degree angle three times and fed into a pose detection model. In doing so, one of the images is guaranteed to be in a standing position which is most easily detected in current models. There are at least three methods to effectively and reliably employ this model:

(1) Composite Images: Composite the four images prior to feeding it the pose detection network.

(2) Use Separate Rotations: Feed image one to the pose detection network, rotate image one 90 degrees then feed the rotated image to the pose detection network, etc. until all four images are processed.

(3) Predict Before Rotation: Feed image one to the pose detection network, if a pose is detected or predicted, accept the result and move on to the next image. If an image is not detected, then rotate the image.

Figure 8:
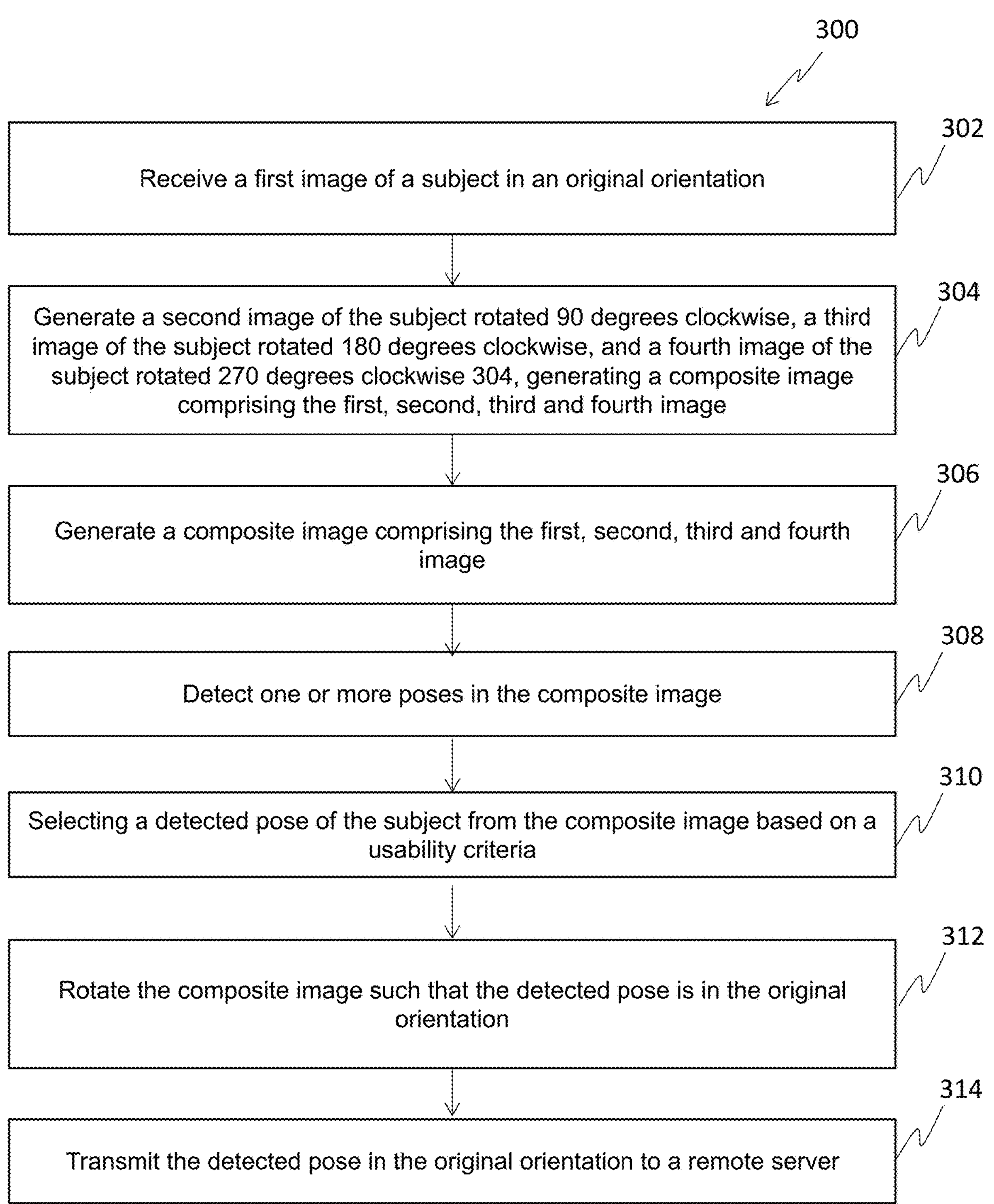
FIG. 8 is a flow chart of a method for pose detection utilizing a composite image according to one embodiment.
Figure 9A:
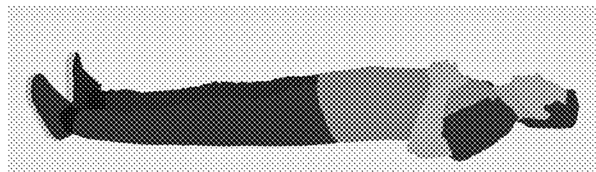
FIGS. 9A though 9D illustrate an example of the method of FIG. 8 according to one embodiment.
Figure 9B:
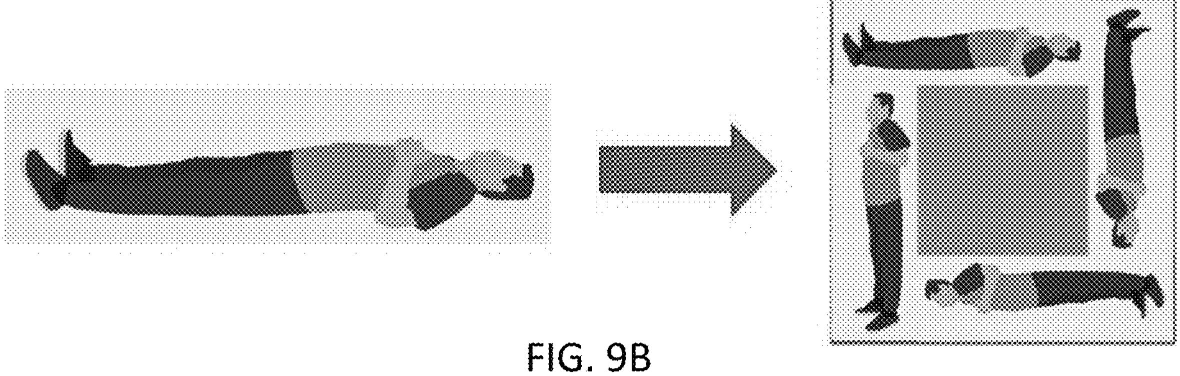
Figure 9C:
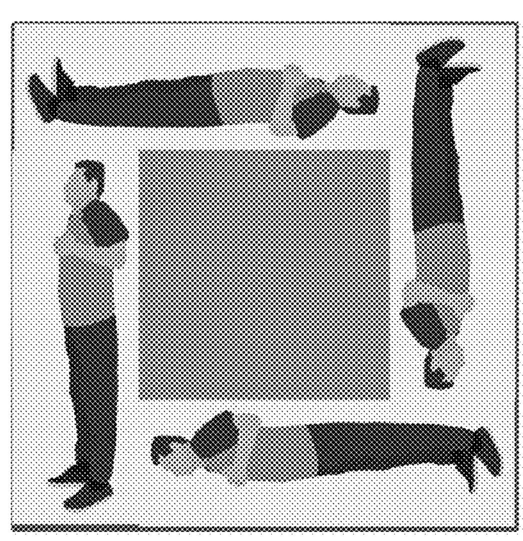
Figure 9D:
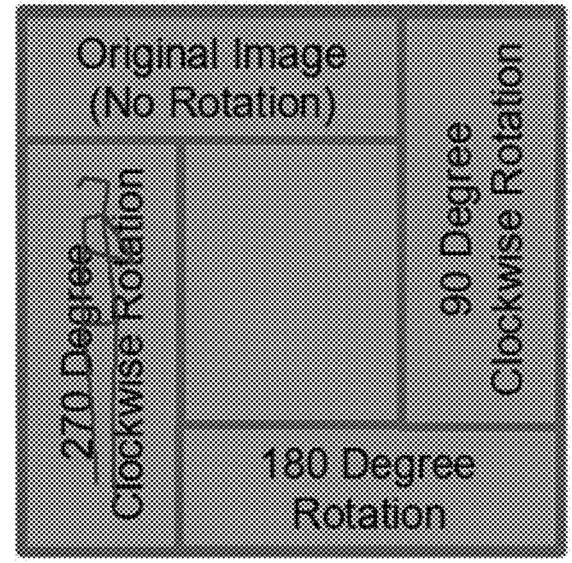
Figure 9D:
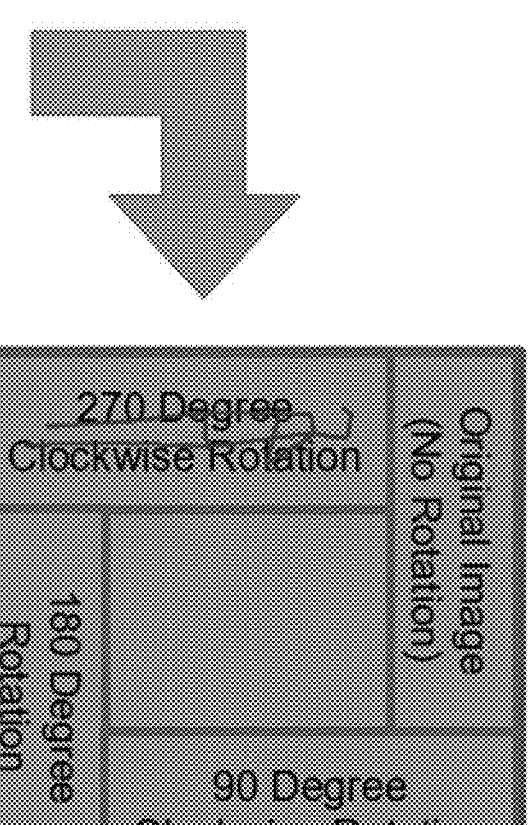

With reference now to FIG. 8, in one embodiment, a method of pose detection 300 includes the steps of receiving a first image of a subject in an original orientation 302, generating a second image of the subject rotated 90 degrees clockwise, a third image of the subject rotated 180 degrees clockwise, and a fourth image of the subject rotated 270 degrees clockwise 304, generating a composite image comprising the first, second, third and fourth image 306, detecting one or more poses in the composite image 308, select a detected pose of the subject from the composite image based on a usability criteria 310, rotating the composite image such that the detected pose is in the original orientation 312, and transmitting the detected pose in the original orientation to a remote server 314. Rotation can be clockwise or counter-clockwise, and the clockwise terminology is for exemplary purposes only as a person having ordinary skill in the art will recognize that rotation relative to the original orientation is what's required. Rotation can be achieved by methods known in the art, such as mathematical rotation using various transformation techniques (e.g. applying a rotation matrix to the coordinates of each pixel in the image).

For example, with reference now to FIGS. 9A-9D, in an embodiment utilizing composite images:

Step 1—Original Frame Is Captured

Original image is captured by the camera software. See e.g. FIG. 9A. Image dimensions are determined (width and height).

Step 2—Rotations Are Created

Three rotations are created: 90 degrees clockwise, 180 degrees, 270 degrees (or 90 degrees counter-clockwise). See e.g. FIG. 9B.

Step 3—Composite Image Is Created

All four images (the original image and the 3 rotations) are composited into one large image with the dimensions of (width of original image+height of original image) by (width of original image+height of original image). See e.g. FIG. 9C.

Step 4—Composite Image Is Processed By Neural Network

The composite image is passed to the pose detection neural network. Poses are checked for "usability" based on the visibility of at least one side of the body (shoulder, hip, and knee at a minimum). Poses that fail this check are discarded as they are not useful for pose interpretation.

Step 5—Poses Are Rotated Back As Needed

Based on the location of the detected poses it can be determined which rotation was used to make it detectable. Using that rotation, the detected poses are rotated back to the original orientation. See e.g. FIG. 9D. This may also include rotating the image back (e.g. using that rotation, the detected poses are rotated back to the original orientation) or identifying the original image. The rotation or identification can be mathematical. That is, the image is not rotated back, the system mathematically "rotates" the array of data that represents the image to be able to identify the original pose.

Step 6—Poses Are Sent to The Pose Interpreter (Cloud)

Pose data is now ready to be sent to the pose interpreter (in the cloud/AWS).

Accordingly, in one embodiment, the method 300 includes determining dimensions of the received image. In one embodiment, the composite image width equals the sum of the width and height of the first image. In one embodiment, the composite image height equals the sum of the width and height of the first image. In one embodiment, the composite image comprises first, second, third and fourth image configured about its perimeter. In one embodiment, the method includes selecting an image of the subject comprises processing the composite image through a pose detection neural network. In one embodiment, the method includes checking for usability comprises detecting visibility of at least one side of the body. In one embodiment, the method includes detecting visibility comprises detecting at least a shoulder, hip, and knee. In one embodiment, the first image is generated by a camera located in a residential environment.

Further, a system for implementing the method 300 for pose detection can include for example a camera communicatively coupled to a controller, the controller configured to: receive a first image of a subject in an original orientation, generate a second image of the subject rotated 90 degrees clockwise, a third image of the subject rotated 180 degrees clockwise, and a fourth image of the subject rotated 270 degrees clockwise, generate a composite image comprising the first, second, third and fourth image, select an image of the subject from the composite image based on a usability criteria, detect a pose in the selected image, rotate the detected pose back to the original orientation, and transmit the detected pose in the original orientation to a remote server. In one embodiment, the controller is configured to determine dimensions of the received image. In one embodiment, the composite image width equals the sum of the width and height of the first image. In one embodiment, the composite image height equals the sum of the width and height of the first image. In one embodiment, the composite image comprises first, second, third and fourth image configured about its perimeter. In one embodiment, selecting an image of the subject comprises processing the composite image through a pose detection neural network. In one embodiment, checking for usability comprises detecting visibility of at least one side of the body. In one embodiment, detecting visibility comprises detecting at least a shoulder, hip, and knee. In one embodiment, the system is a system for monitoring of a subject and the first image is generated by a camera located in a residential environment.

Figure 10:
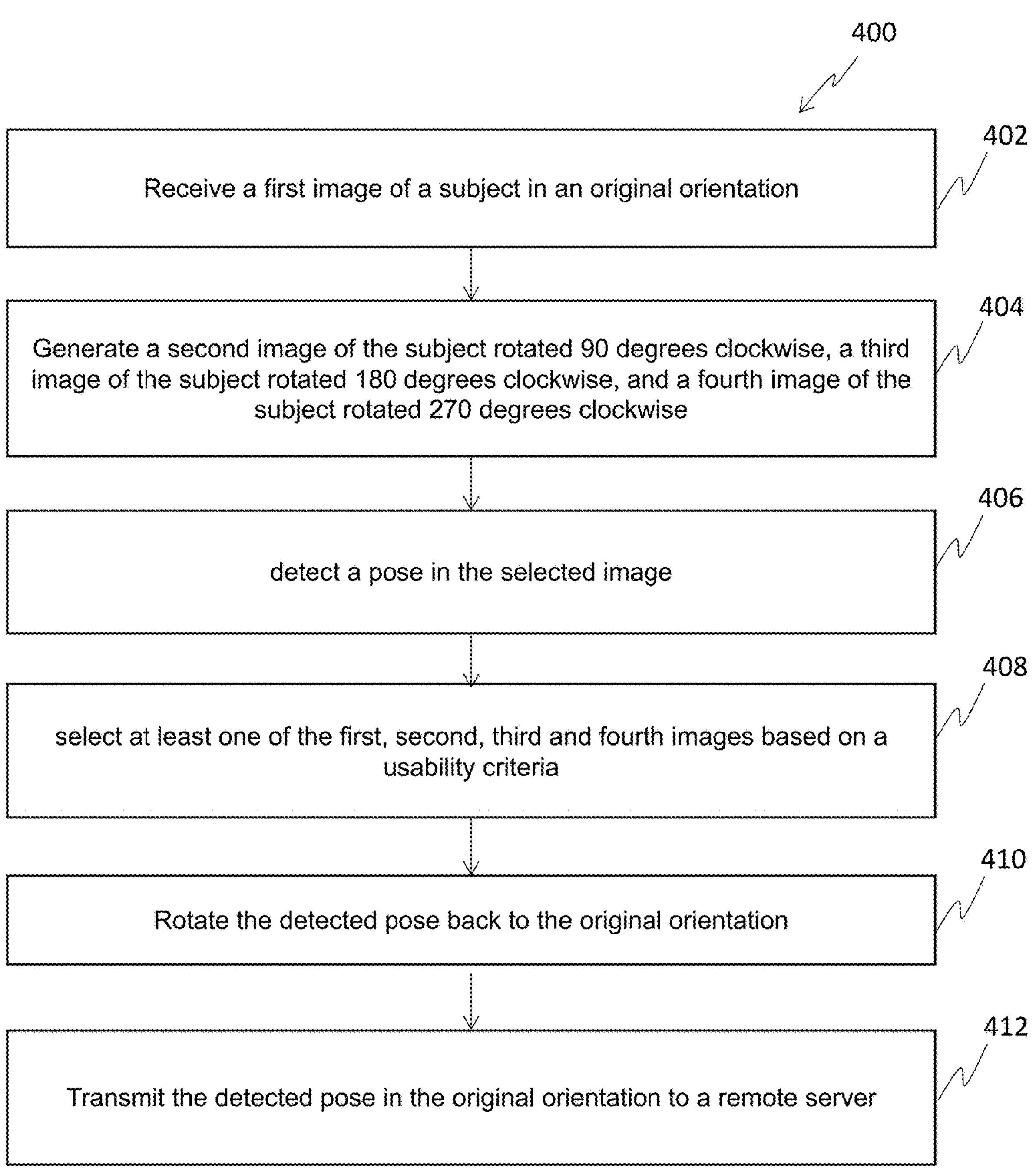
FIG. 10 is a flow chart of a method for pose detection using separate rotations according to one embodiment.

With reference now to FIG. 10, in one embodiment, a method of pose detection 400 includes the steps of receiving a first image of a subject in an original orientation 402, generating a second image of the subject rotated 90 degrees clockwise, a third image of the subject rotated 180 degrees clockwise, and a fourth image of the subject rotated 270 degrees clockwise 404, detecting a pose in the selected image 406, selecting at least one of the first, second, third and fourth images based on a usability criteria 408, rotating the detected pose back to the original orientation 410, and transmitting the detected pose in the original orientation to a remote server 412.

For example, with reference now to FIGS. 11A-11D, in an embodiment utilizing separate rotations, a single image and three other rotated images are individually sent to the pose detection neural network for pose detection. Each image is tagged with its angle of rotation for future use in understanding the real body position. The process according to one embodiment is as follows:

Step One—Original Frame Is Captured and Tagged

Figure 11A:
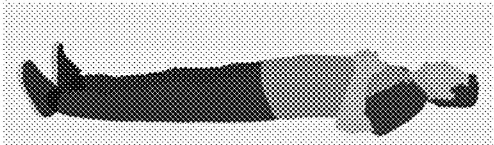
FIGS. 11A though 11D illustrate an example of the method of FIG. 10 according to one embodiment.

The original image is captured by the camera software (see e.g. FIG. 11A). Image dimensions are determined (width and height), the image is tagged (e.g. "Original" or "first"), and the image is sent to the pose detection neural network.

Step 2—Rotate Original Image 90 degrees

Figure 11B:
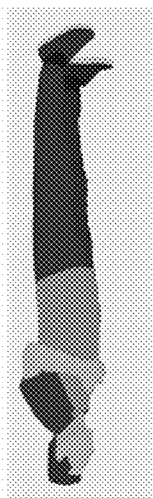

The original image is captured by the camera software (see e.g. FIG. 11B). Image dimensions are determined (width and height), the image is tagged (e.g. "90 degrees" or "second"), and the image is sent to the pose detection neural network.

Step 3—Rotate Original Image 180 Degrees

Figure 11C:
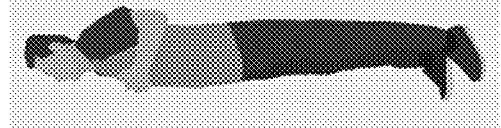

The original image is captured by the camera software (see e.g. FIG. 11C). The image dimensions are determined (width and height), the image is tagged (e.g. "180 degrees" or "third"), and the image is sent to pose detection neural network.

Step 4—Rotate Original Image 270 Degrees

Figure 11D:
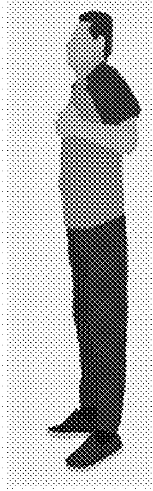

The original image is captured by the camera software (see e.g. FIG. 11D). The image dimensions are determined (width and height), the image is tagged (e.g. "270 degrees" or "fourth"), and the image is sent to pose detection neural network.

Step 5—Analyze Results

Poses are checked for "usability" based on a predetermined algorithm or criteria. For example, in one embodiment, poses are checked for usability based on determining a threshold visibility of at least one side of the body (shoulder, hip, and knee at a minimum). Poses that fail this check are discarded as they are not useful for pose interpretation. Based on the location of the detected poses it can be determined which rotation was used to make it detectable. Using that rotation, the original orientation is identified. Pose data is now ready to be sent to the pose interpreter (e.g. in the cloud/AWS).

Accordingly, in one embodiment, the method 400 includes the step of selecting an image of the subject comprises processing the image through a pose detection neural network. In one embodiment, the method includes the step of checking for usability comprises detecting visibility of at least one side of the body. In one embodiment, the method includes the step of detecting visibility comprises detecting at least a shoulder, hip, and knee.

Further, in one embodiment, a system for implementing the method 400 for pose detection includes a camera communicatively coupled to a controller, the controller configured to: receive a first image of a subject in an original orientation, generate a second image of the subject rotated 90 degrees clockwise, a third image of the subject rotated 180 degrees clockwise, and a fourth image of the subject rotated 270 degrees clockwise, select at least one of the first, second, third and fourth images based on a usability criteria, detect a pose in the selected image, rotate the detected pose back to the original orientation, and transmit the detected pose in the original orientation to a remote server. In one embodiment, selecting an image of the subject includes processing the composite image through a pose detection neural network. In one embodiment, checking for usability comprises detecting visibility of at least one side of the body. In one embodiment, detecting visibility comprises detecting at least a shoulder, hip, and knee.

Figure 12:
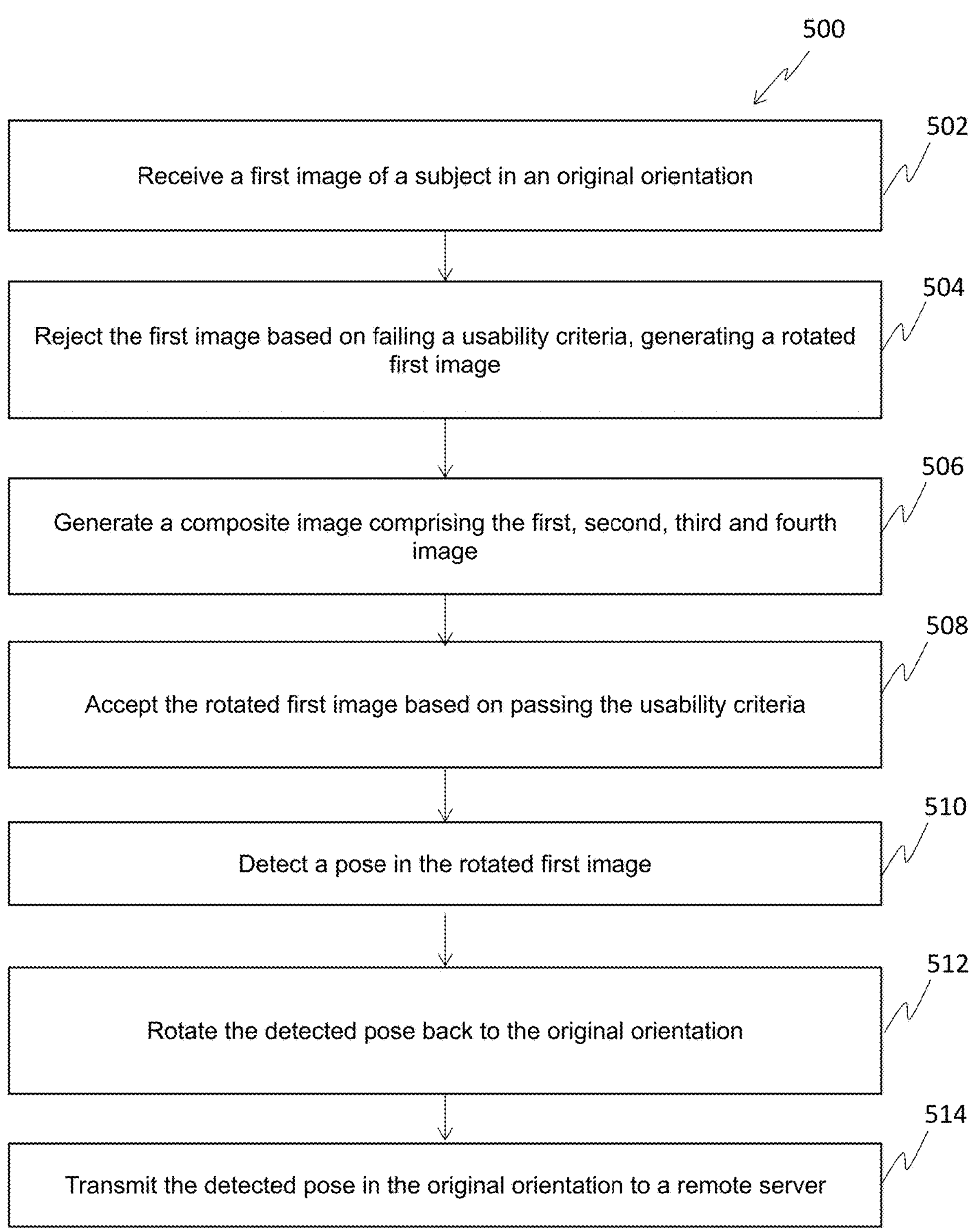
FIG. 12 is a flow chart of a method of pose detection using prediction before rotation according to one embodiment.

With reference now to FIG. 12, in one embodiment, a method of pose detection 500 includes the steps of receiving a first image of a subject in an original orientation 502, rejecting the first image based on failing a usability criteria 504, generating a rotated first image 506, accepting the rotated first image based on passing the usability criteria 508, detecting a pose in the rotated first image 510, rotating the detected pose back to the original orientation 512, and transmitting the detected pose in the original orientation to a remote server 514.

Figure 13:
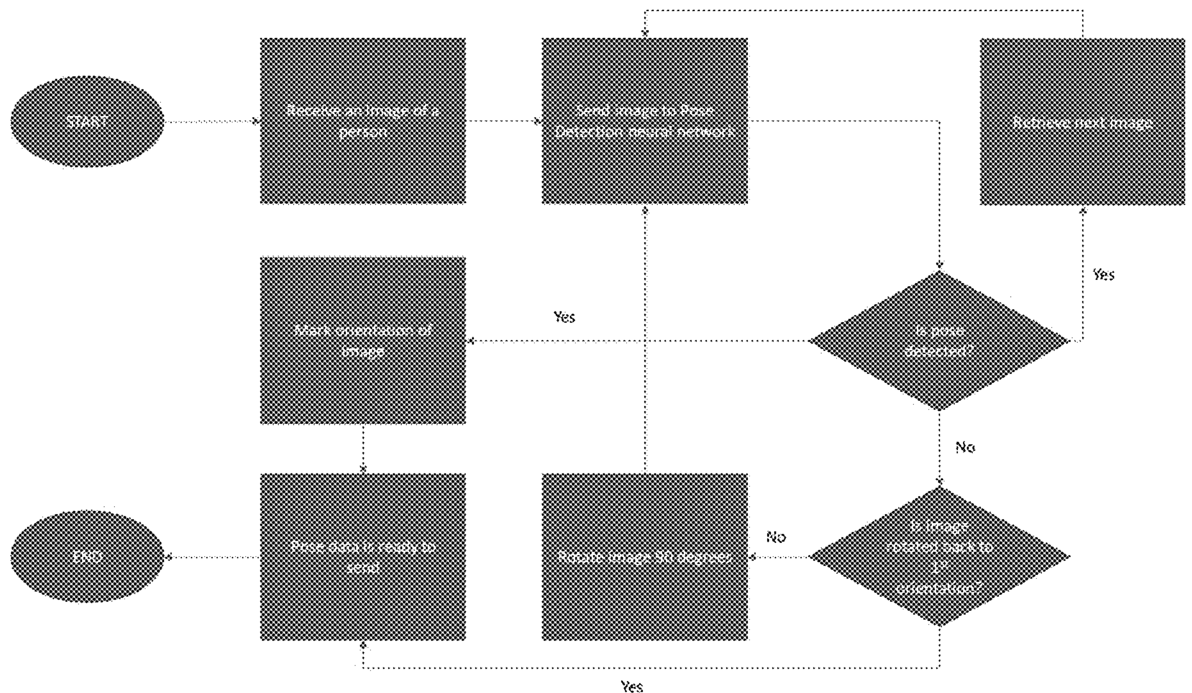
FIG. 13 is flow chart illustrating an example of the method of FIG. 12 according to one embodiment.

For example, with reference now to FIG. 13, in an embodiment for predicting before rotation, an image is first fed to the pose detection neural network to see if a pose is detected or predicted. If the pose is detected, then the orientation is marked (e.g. "original" or "first"). If the pose is not detected, the image is rotated and sent to the pose detection neural network again. If the pose is detected, the orientation is marked (e.g. "90 degrees" or "second"). This process is continued until an image is rotated three times.

Accordingly, in one embodiment, the method 500 step of selecting an image of the subject includes processing the composite image through a pose detection neural network. In one embodiment, the rotated first image is rotated 90 degrees from the original orientation. In one embodiment, the rotated first image is rotated 180 degrees from the original orientation. In one embodiment, the rotated first image is rotated 270 degrees from the original orientation. In one embodiment, checking for usability comprises detecting visibility of at least one side of the body. In one embodiment, detecting visibility comprises detecting at least a shoulder, hip, and knee.

Further, in one embodiment, a system for implementing the method 500 of pose detection includes a camera communicatively coupled to a controller, the controller configured to: receive a first image of a subject in an original orientation, reject the first image based on failing a usability criteria, generate a rotated first image, accept the rotated first image based on passing the usability criteria, detect a pose in the rotated first image, rotate the detected pose back to the original orientation, and transmit the detected pose in the original orientation to a remote server. In one embodiment, selecting an image of the subject comprises processing the composite image through a pose detection neural network. In one embodiment, the rotated first image is rotated 90 degrees from the original orientation. In one embodiment, the rotated first image is rotated 180 degrees from the original orientation. In one embodiment, the rotated first image is rotated 270 degrees from the original orientation. In one embodiment, checking for usability comprises detecting visibility of at least one side of the body. In one embodiment, detecting visibility comprises detecting at least a shoulder, hip, and knee.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A method of pose detection comprising:

receiving from a controller communicatively coupled to a camera a first image of a subject in an original orientation;

generating a second image of the subject rotated 90 degrees from the original orientation, a third image of the subject rotated 180 degrees from the original orientation, and a fourth image of the subject rotated 270 degrees from the original orientation;

generating a composite image comprising the first, second, third and fourth image;

detecting one or more poses in the composite image;

selecting a detected pose of the subject from the composite image based on a usability criteria;

rotating the composite image such that the detected pose is in the original orientation; and transmitting the detected pose in the original orientation to a remote server;

wherein the composite image width equals the sum of the width and height of the first image; and wherein selecting a detected pose of the subject comprises processing the composite image through a pose detection neural network.

2. The method of claim 1 further comprising:

determining dimensions of the received image.

3. The method of claim 2, wherein the composite image height equals the sum of the width and height of the first image.

4. The method of claim 2, wherein the composite image comprises first, second, third and fourth image configured about its perimeter.

5. The method of claim 1 further comprising:

checking for usability comprises detecting visibility of at least one side of the body.

6. The method of claim 5, wherein detecting visibility comprises detecting at least a shoulder, hip, and knee.

7. A method for monitoring of a subject comprising:

the method of claim 1, wherein the first image is generated by a camera located in a residential environment.

8. A system for pose detection comprising:

a camera communicatively coupled to a controller, the controller configured to:

receive a first image of a subject in an original orientation;

generate a second image of the subject rotated 90 degrees from the original orientation, a third image of the subject rotated 180 degrees from the original orientation, and a fourth image of the subject rotated 270 degrees from the original orientation;

generate a composite image comprising the first, second, third and fourth image;

select an image of the subject from the composite image based on a usability criteria;

detect a pose in the selected image;

rotate the detected pose back to the original orientation; and transmit the detected pose in the original orientation to a remote server;

wherein the composite image width equals the sum of the width and height of the first image; and wherein selecting the image of the subject comprises processing the composite image through a pose detection neural network.

9. The system of claim 8, wherein the controller is configured to:

determine dimensions of the received image.

10. The system of claim 9, wherein the composite image height equals the sum of the width and height of the first image.

11. The system of claim 9, wherein the composite image comprises first, second, third and fourth image configured about its perimeter.

12. The system of claim 9, wherein checking for usability comprises detecting visibility of at least one side of the body.

13. The system of claim 12, wherein detecting visibility comprises detecting at least a shoulder, hip, and knee.

14. A system for monitoring of a subject comprising:

the system of claim 8, wherein the first image is generated by a camera located in a residential environment.

* * * * *